Feb. 23, 1943.  J. A. SIMS ET AL  2,312,289
CLAMP
Filed May 15, 1941

Inventor
JOSEPH A. SIMS
J. B. Spurlock
By William A. Lewis Jr
E. V. Hovdway
Attorney Patented Feb. 23, 1943

2,312,289

UNITED STATES PATENT OFFICE 2,312,289

CLAMP

Joseph A. Sims, J. B. Spurlock, and William A. Lewis, Jr., Houston, Tex.; said Spurlock assignor to said Sims and said Lewis, Jr.

Application May 15, 1941, Serial No. 393,656

5 Claims. (Cl. 287—54)

This invention relates to a clamp.

An object of the invention is to provide a clamp particularly designed for clamping, in fixed relation, a plurality of braces used for bracing structural work. The bracing to which the clamp is attached may be of either tubular or solid material and it is to be understood that in referring to rods or bars in the following specifications, tubing is also contemplated.

Another object of the invention is to provide a clamp of the character described embodying a plurality of clamp jaws so shaped as to clamp, in fixed relation, brace rods of round, square, or other cross sectional shape and which may be made of any selected size depending on the stress to which the bracing will be subjected.

A further object of the invention is to provide a clamp of the character described formed to clamp together brace rods, or bars, of any selected shape, in such manner as to take care of stresses of both compression and tension to which the bracing may be subjected either in a common plane or in a plurality of intersecting planes.

The clamp has been particularly designed for clamping together brace rods, or bars, which are united, at their ends, to the structure to be braced and which are clamped together, by the type of clamp herein described at points intermediate their ends.

With the above and other objects in view the invention has particular relation to certain novel features of construction, arrangement of parts and use, examples of which are given in this specification and illustrated in the accompanying drawing, wherein.

Figure 3:
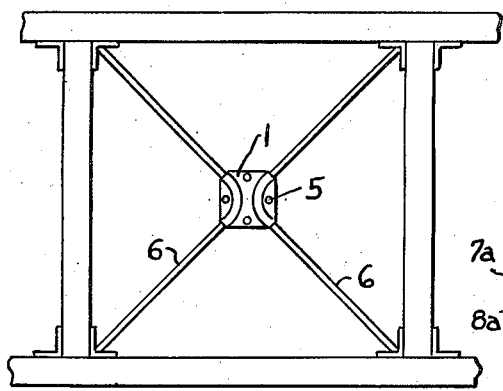
Figure 3 shows an elevational view of the clamp connecting together a pair of brace rods lying in a common plane.

Referring now more particularly to the drawing wherein like numerals of reference designate the same parts in each of the figures, the numerals 1, 2 designate plate-like jaws, preferably formed of metal, and approximately rectangular in shape. These jaws have the pairs of arcuate grooves 3, 3 and 4, 4, the grooves 3 of one jaw registering with the grooves 4 of the opposing jaw when said jaws are assembled together. The jaws are maintained in assembled relation by means of clamp bolts 5, 5. This type of clamp is designed for the purpose of clamping together two brace rods as 6, 6, said rods lying in a common plane and having their ends suitably secured to the structure to be braced and having their intermediate portions lying adjacent and curved to fit into the corresponding pairs of grooves 3, 4.

As so assembled, the clamp will take care of stresses of both compression and tension along two intersecting lines lying in a common plane and the jaws themselves will assume said stresses and the clamp bolts will be relieved of all shearing stresses.

Figure 4:
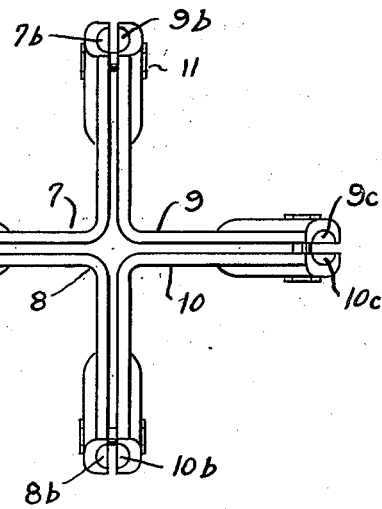
Figure 4 shows an end view of another embodiment of the invention used for connecting together brace rods lying in a plurality of intersecting planes.
Figure 2:
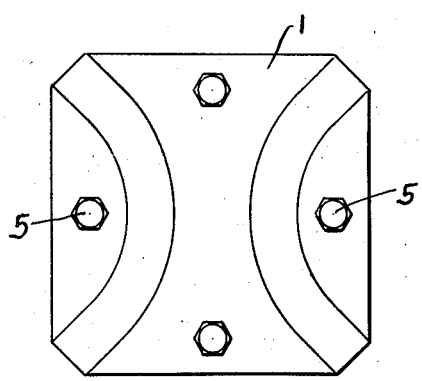
Figure 2 shows an elevational view.
Figure 5:
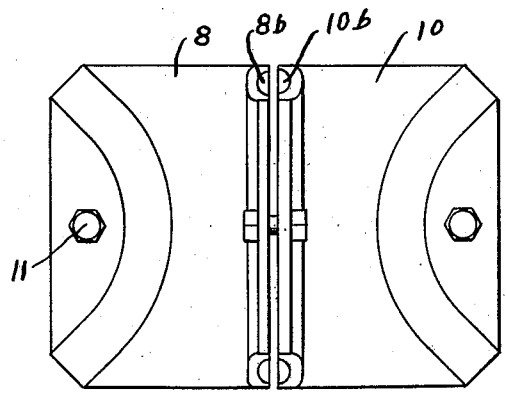
Figure 5 shows a side elevation thereof.
Figure 1:
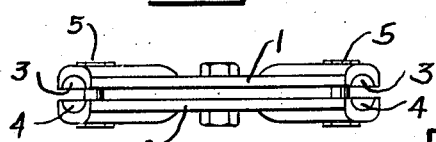
Figure 1 shows an edge view of a simple form of the clamp.

In the form shown in Figures 4 and 5, a plurality of clamp jaws are assembled together, the number of jaws assembled corresponding to the number of brace rods, or bars, to be anchored together by them. These jaws are indicated by the numerals 7, 8 and 9, 10. When assembled, their wings coincide and are provided with the arcuate grooves 7a, 8a; 7b, 9b; 8b, 10b, and 9c, 10c, the pairs of grooves, as above indicated, coinciding so as to clamp around the intermediate curved portions of the rods, or braces, to be clamped together. The ends of the rods, so clamped together, will be attached, in any suitable manner, to the structure to be braced and the coinciding wings of the jaws 7, 8, 9 and 10 being clamped together by the clamp bolts 11. These clamp bolts will not be subjected to any shearing, strain or stress and the compression and tension stresses originating from or directed toward many different points lying in multiple intersecting planes will be assumed by the clamp.

The strength of the bracing will be maintained without being impaired by the provision of bolt holes therein or other mutilation thereof. By the use of this type of clamp, a tower, truss or other similar structure formed of tubing, may be pre-fabricated by welding sections small enough to permit galvanizing in conventional galvanizing vats. The type of clamp hereinabove described may be quickly and easily applied to the structure thus expediting the work of erection; furthermore, the type of clamp herein described will permit the clamping together of a plurality of structural braces in such manner as to properly distribute the stress between the braces and to securely fix the brace members so as to maintain their rigidity and strength.

The drawing and description are illustrative merely while the broad principle of the invention will be defined by the appended claims.

What we claim is:

1. A brace clamp comprising a plurality of angular clamp jaws each jaw having wings at right angles to each other, the corresponding wings of the jaws being parallel and located closely adjacent each other, said wings being provided with approximately arcuate registering grooves shaped to receive correspondingly shaped portions of braces between the wings and means for clamping the adjacent wings of the jaws together about the braces.

2. A brace clamp comprising four angular clamp jaws having wings arranged parallel and closely adjacent and provided with registering grooves in adjacent sides of the wings shaped to receive braces between the wings and in the grooves and means for clamping the corresponding wings of the respective jaws together about the braces.

3. A brace clamp comprising four similarly shaped angular clamp jaws having corresponding wings which are parallel and whose inner faces are adjacent and provided with registering grooves shaped to receive braces in said grooves and releasable means for clamping the corresponding wings of the respective jaws together about the braces.

4. A brace clamp comprising four similarly shaped clamp jaws, each jaw being formed of wings at right angles to each other, said jaws being arranged with the wings of the corresponding jaws being parallel and located closely adjacent each other, the corresponding wings being provided with registering grooves in their adjacent sides shaped to receive a brace between the wings and releasable means for clamping said corresponding wings of the respective jaws together about a brace.

5. In a construction of the character described, a brace clamp comprising four similarly shaped clamp jaws, each jaw being formed of wings at right angles to each other, said jaws being arranged with the corresponding wings of the jaws in parallel relation and located closely adjacent each other, the corresponding wings being provided with registering grooves in their adjacent sides, braces between the corresponding wings which are fitted in the grooves of said wings and releasable means for clamping said corresponding wings of the respective jaws together about the braces in said grooves.

JOSEPH A. SIMS.
J. B. SPURLOCK.
WILLIAM A. LEWIS, Jr.